United States Patent [19]

Führmann

[11] 4,063,757
[45] Dec. 20, 1977

[54] FITTING FOR CONDUITS WITH CORRUGATED TUBES AND HOSES

[75] Inventor: Siegfried Führmann, Gleidingen, Germany

[73] Assignee: Kabel-und Metallwerke Gutehoffnungshutte AG, Hannover, Germany

[21] Appl. No.: 719,363

[22] Filed: Sept. 1, 1976

[30] Foreign Application Priority Data

Sept. 12, 1975 Germany .............................. 2541242

[51] Int. Cl.² .......................................... F16L 39/02
[52] U.S. Cl. .................... 285/149; 285/251; 285/DIG. 4
[58] Field of Search ............... 285/149, DIG. 4, 251, 285/388

[56] References Cited

U.S. PATENT DOCUMENTS

| 1,091,759 | 3/1914 | Paradis | 285/149 |
| 2,696,394 | 12/1954 | Kaiser | 285/251 |
| 2,809,056 | 10/1957 | Kaiser | 285/149 |
| 2,848,254 | 8/1958 | Millar | 285/149 |
| 3,306,637 | 2/1967 | Press et al. | 285/149 |
| 3,488,073 | 1/1970 | Wold | 285/388 |
| 3,844,587 | 10/1974 | Fuhrmann et al. | 285/DIG. 4 X |

FOREIGN PATENT DOCUMENTS

| 565,460 | 3/1958 | Belgium | 285/149 |
| 2,210,269 | 6/1974 | France | 285/149 |

Primary Examiner—Thomas F. Callaghan
Attorney, Agent, or Firm—Ralf H. Siegemund

[57] ABSTRACT

The fitting has a main part which has two axially spaced corrugations, one for engaging the corrugations of the tube, the other engaging the hose projecting from the tube. A sleeve with outer corrugations engages the hose from the inside. Armoring is clamped separately onto the outside of the main part.

7 Claims, 1 Drawing Figure

U.S. Patent  Dec. 20, 1977  4,063,757
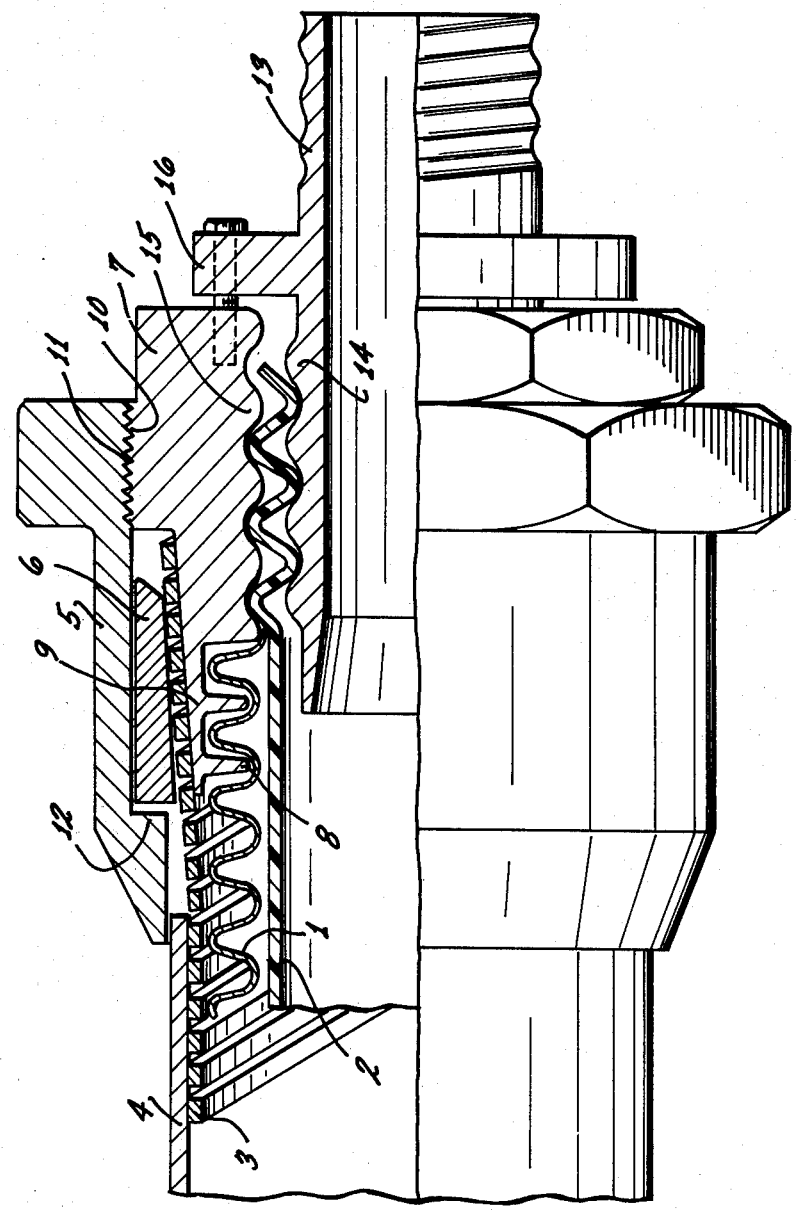

FITTING FOR CONDUITS WITH CORRUGATED TUBES AND HOSES

BACKGROUND OF THE INVENTION

The present invention relates to a fitting for connection to and termination of a conduit assembly comprised of a corrugated metal tube and a plastic hose inserted in the tube.

The German printed application No. 2,405,121 discloses a hose which is protected against fire and other sources of heat, by an outer corrugated tube. The latter tube has a protective cover to extinguish any glowing fire. These types of conduits are used for conducting fluids, e.g. to machines or the like.

These conduits must be connected to the source and destination for the fluid by means of fittings threaded onto and into the corrugated metal tube. The hose will be clamped between the inserted part of the fitting and the corrugated metal tube. Accordingly, the geometry of the corrugation must match precisely the threading of the fitting otherwise the plastic hose will be squeezed too strongly and torn.

DESCRIPTION OF THE INVENTION

It is an object of the present invention to provide a new and improved fitting for connection to a conduit having a corrugated metal tube and a plastic hose, which fitting is to be independent from the corrugation geometry as far as clamping the hose is concerned, and will not damage the hose accordingly.

In accordance with the preferred embodiment of the invention, it is suggested to use a tubular flange part as main part or central fitting element which has inner corrugations for engaging a corrugated tube from the outside only and which threadely engages an inserted hose, also from the outside, by means of an axially spaced corrugation or threading, the tube having been cut away to expose an end portion of the hose. A sleeve with outer threading or corrugation is threaded into the hose, coacting with the thread of the flange element as engaging the hose to clamp the hose in between without clamping it against the tube.

If the corrugated tube is armored by loops of wires, the latter may be clamped between the flange element and an outer flange means. The latter has preferably an inner, axially movable annulus with a conical inner surface coacting with an outer conical end surface of the flange part, the armoring being clamped in between, while the annulus is held against an edge of an outer sleeve, threaded onto the flange part.

The flange part may engage the corrugated tube threadedly if the corrugations are helical. If the tube has circular corrugations the flange part has correspondingly an annular groove pattern but is of axially split construction, held together by a nut. The outer flange, if used for holding the armoring, may also provide the function of holding the flange parts together.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE is a cross-section through a fitting in accordance with the preferred embodiment of the present invention.

Proceeding now to the detailed description of the drawing, a conduit is comprised of an outer corrugated tube 1 and an inner hose 2. The tube 1 has been preferably made by forming a metal strip into a split tube and welding the now adjoining or overlapping edges. The tube was then corrugated. This process permits manufacturing of endless tubing.

The hose 2 is made of plastic or any other suitable rubber elastic material. The tube 1 carries an armoring 3 comprised of a plurality of densely placed, flat or round wires, wound on the tube 1 at a large pitch. The corrugation of tube 1 can but does not have to be a helical one; the pitch of wires 3 is much larger than any corrugation pitch so that each wire loop crosses several or even many corrugation ridges of tube 1.

A fire and heat protection layer, cover or jacket 4, is provided onto the armoring. The material to be used here may be of the type disclosed in German Patent application No. 2,140,806.

In order to connect the conduit to a fitting, a portion of tube 1 is cut off at first so that a portion of hose 2 becomes exposed and projects from the metal tube. The cover 4 is even removed further exposing a portion of the tube 1 as well as of the armoring 3. At first, a sleeve 5 with flange is placed in position, so is an annulus 6, the latter being inserted in the sleeve 5; elements 5 and 6 together constitute an outer flange means. The sleeve 5 has an inner edge against which annulus 6 abuts for limiting its axial displacement in sleeve 5.

The main part of the fitting is flange part 7, having a rather coarse helical duct 8 being a corrugation possibly resembling a threading which is threaded onto the tube 1. Broadly speaking, fitting element 7 has at one end a groove and ridge pattern with rather wide grooves and narrow ridges the helical geometry of which matches the geometry of the corrugation of tube 1, in that particularly the ridges between grooves 8 can readily be inserted into the outer corrugation grooves of tube 1. However, the pitches do not have to match exactly, and there may even be some initial slack as corrugation 8 is threaded onto the corrugation of tube 1.

Element 7 has an outer conical surface 9 which slides under the armoring 3 but urges the latter against a similarly conical surface of annulus 6. Further insertion of element 7 causes its thread 10 to engage an internal thread 11 of part 5. This way, parts 6 and 7 are tied together. Upon further threaded insertion, part 7 engages the tube 1 more forcefully while part 6 is urged against edge 12 by the outer conicity of element 7 acting via the armoring 3.

It can readily be seen that the construction is also applicable in principle to annular corrugations of tube 1, so that the groove 8 and ridge pattern of element 7 is likewise annular. In this case, element or part 7 is actually made of two axially split parts, placed onto tube 1 from the side. The sleeve 5 has been shifted to the left to permit that insertion and is then threaded onto elements 7 towards the right to provide for armoring, clamping as well as holding elements 7 together.

Another element of the fitting is the sleeve 13 having along its front part a rather wide, coarsely pitched thread way 14. The flange 7 has a complementary threading 15, but it can be seen that outer and inner diameters, respectively, differ. The drawing exaggerates that difference. The pitch of threading 14 increases towards the end of sleeve 13 (the end that reaches farthest into the hose). Threading 15 is uniform. Part 13 is actually threaded into the hose which is gently compelled to assume a corrugated contour. The corrugations or thread ways here are smooth so that there is no danger that the hose 2 will be cut.

In order to avoid loosening of the sleeve 13, it is desirable to secure parts 13 and 7 to each other. Sleeve 13 is provided with a flange 16 which may be bolted to the axial outer end of part 7. This is another way of holding part 7 together, if made of two axially split parts.

It can thus be seen that the inventive fitting is quite simple to make because it is comprised of simple parts which are put together on location. Moreover, installation does not require any special skills. The parts are reusable, i.e. the fitting can be removed and reinstalled.

The invention is not limited to the embodiments described above but all changes and modifications thereof not constituting departures from the spirit and scope of the invention are intended to be included.

I claim:

1. A fitting for connection to a conduit having a corrugated outer tube and an inner elastic hose, an end portion of the outer tube having been cut for exposing the hose, comprising:

a flange part having internal grooves and ridges defining a corrugation pattern for engaging corrugations of the outer tube from the outside, said flange part having additionally an inner threading with smooth corrugation ridges and being axially displaced from said grooves and ridges for engagement of the inner hose where exposed; and a sleeve having smooth-surface thread ways substantially matching the inner threading of the flange part, but being of smaller diameter for being threadedly inserted in said flange part and said hose for clamping the hose against the inner threading while the hose conforms to the contour of the sleeve threading and of the inner threading of the flange part, in that ridges of either threading urge the hose into opposite grooves of the respective other threading.

2. A fitting as in claim 1, for use at a conduit having an outer armoring, said flange part for being inserted between the armoring and the tube and having an outer conical surface; and a flange means threaded onto the flange part for engaging the armoring from the outside and holding it against said conical surface.

3. A fitting as in claim 2, the flange means including an outer sleeve and an annular insert held axial against an inner edge in the outer sleeve and having a conical inner surface for coaction with said conical surface of said flange part.

4. A fitting as in claim 1, for use with a tube having a helical corrugation, said groove and ridge pattern being of helical contour accordingly.

5. A fitting as in claim 1, for use with a tube having an annular corrugation, said groove and ridge pattern being annular accordingly, the flange part being axially split; and thread means holding the flange parts together.

6. A fitting as in claim 1, said sleeve having a threading with increasing pitch towards its end being inserted.

7. A fitting as in claim 1, said sleeve and said flange part being secured to each other.

* * * * *